W. J. MITCHELL & M. W. ATKINS.
HEADLIGHT FOR AUTOMOBILES.
APPLICATION FILED JUNE 26, 1912.
1,062,842.
Patented May 27, 1913.
2 SHEETS—SHEET 1.
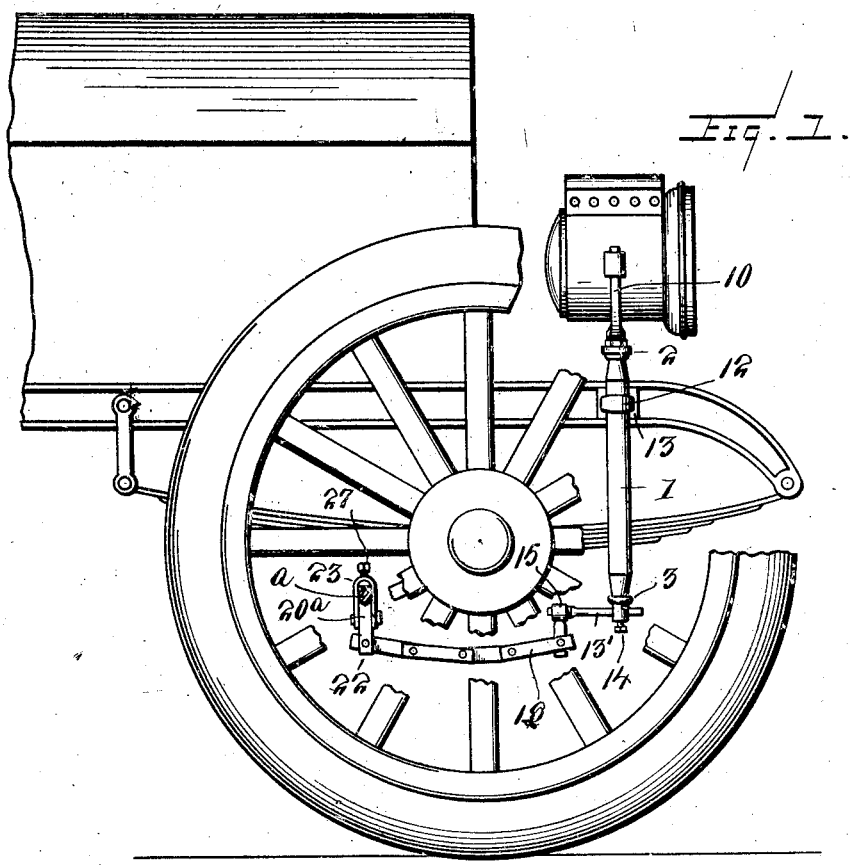
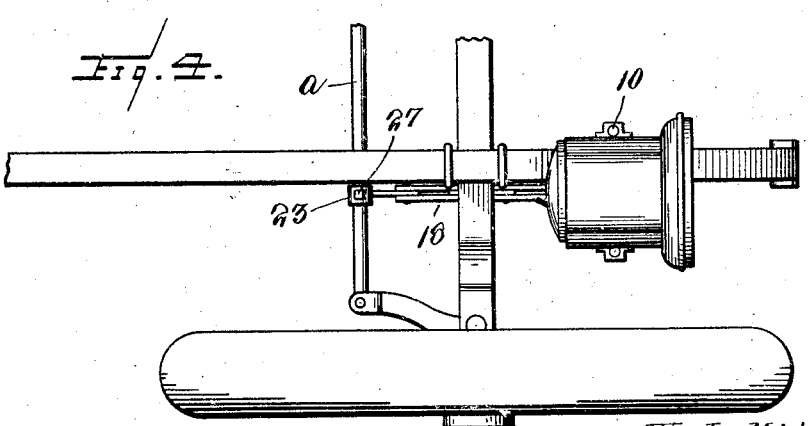
Witnesses
E. Q. Ruffout
J. W. Garner
Inventors
W. J. Mitchell
M. W. Atkins
By Victor J. Evans
Attorney

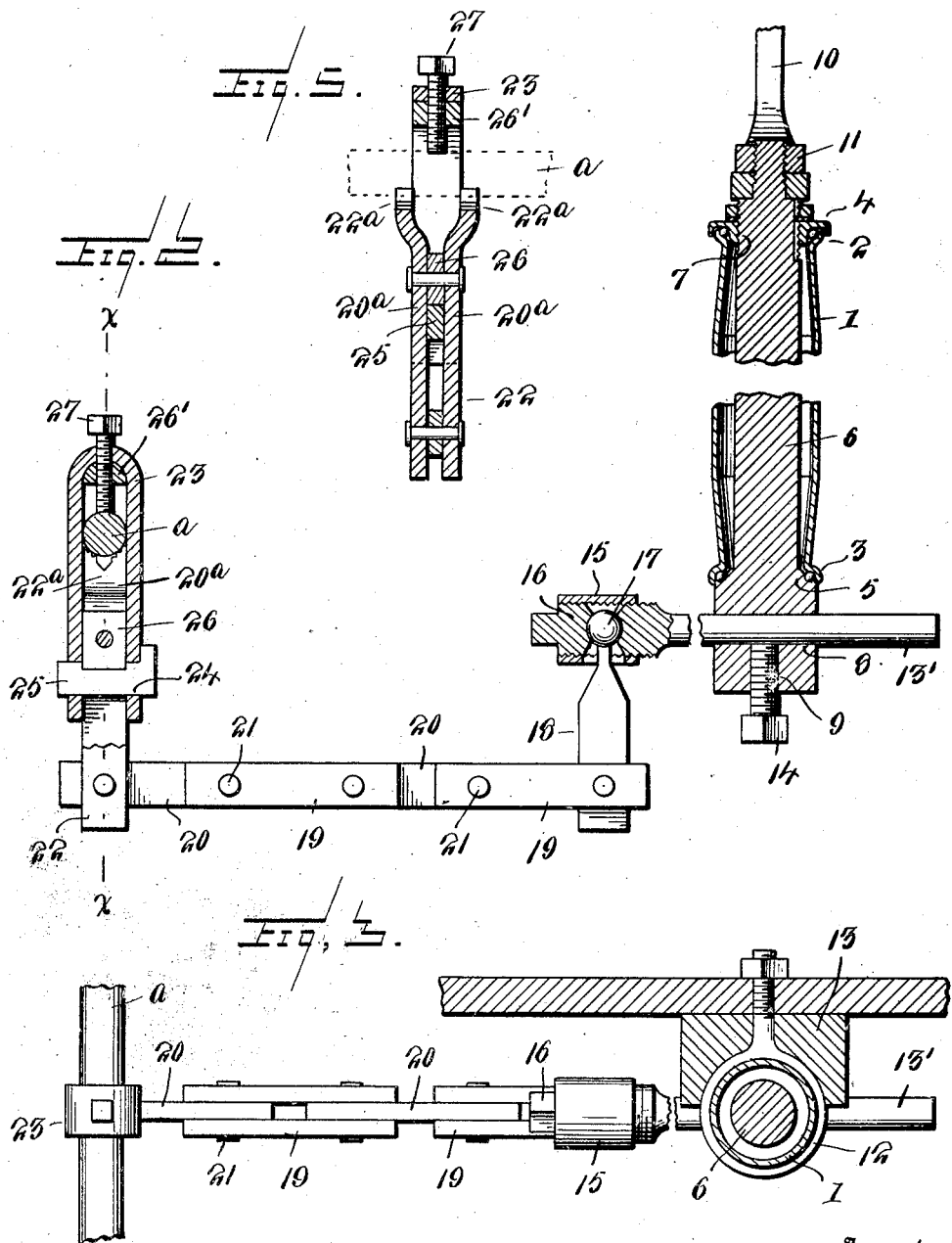

UNITED STATES PATENT OFFICE.

WILLIAM J. MITCHELL AND MILTON W. ATKINS, OF RIDGEWAY, VIRGINIA.

HEADLIGHT FOR AUTOMOBILES.

1,062,842.

Specification of Letters Patent.

Patented May 27, 1913.

Application filed June 26, 1912. Serial No. 706,036.

*To all whom it may concern:*

Be it known that we, WILLIAM J. MITCHELL and MILTON W. ATKINS, citizens of the United States, residing at Ridgeway, in the county of Henry and State of Virginia, have invented new and useful Improvements in Headlights for Automobiles, of which the following is a specification.

This invention relates to improvements in headlights for automobiles and especially with reference to means for mounting an automobile headlight and turning the headlight automatically by the same movement of the steering wheel that guides the machine so as to cause the headlight to follow the direction of the front wheels when taking curves, the invention consisting in the construction, combination and arrangement of devices hereinafter described and claimed.

In the accompanying drawings: Figure 1 is an elevation of the front portion of an automobile provided with a headlight constructed in accordance with our invention. Fig. 2 is a detail vertical sectional view of one of the attachments for mounting and automatically turning the headlight. Fig. 3 is a transverse sectional view of the same. Fig. 4 is a diagrammatic plan. Fig. 5 is a detail vertical sectional view on the plane indicated by the line $x$—$x$ of Fig. 2.

In practice, we provide a pair of our improved headlight mounting and guiding attachments for an automobile, one of the attachments being located on each side of the chassis, near the front end thereof. Since both of our attachments are alike, we will describe in detail only one of them.

A tubular standard 1 which has its upper and lower ends partially tapered, is provided at its upper and lower ends with ball bearings 2—3 which, respectively, engage a cap 4 and a base 5 of a spindle 6, the spindle being thus pivotally mounted in and extending through the standard and the cap being screwed on the upper portion of the spindle as at 7. The base is provided with a transverse opening 8 and also with a vertical threaded opening 9. On the upper end of the spindle is secured a substantially U-shaped yoke 10 which serves to support an automobile headlight. The yoke is provided with a central opening through which the upper end of the spindle 6 extends, the central portion of the yoke bearing on the cap 4 and the yoke being held in place on the spindle and cap by means of a nut 11 which is secured on the upper end of the spindle and bears on the upper side of the central portion of the yoke.

The tubular standard passes through the eye of a clamping bolt 12. The said clamping bolt passes through, and the inner side of its eye is embedded in a clamping block 13. This block is recessed in its outer side to receive the standard, so that that portion of the standard which is engaged by the block is partially embedded therein. The shank of the clamping bolt, in practice, passes through one side of the chassis and, hence, said clamping bolt in connection with the block, clamps the standard in place. In practice, this clamp, comprising the block and the bolt may be made of any suitable style and shape to fit either the top or side of the chassis of an automobile of any make.

In connection with the spindle, we provide a longitudinally adjustable radius arm 13′ which passes through and is adjustable in the opening 5 and is secured in place in any desired adjustment by means of a set screw 14 which operates in the threaded opening 9. This radius arm is provided at its outer end with a tubular sleeve 15 which is screwed thereto and in the outer end of the sleeve is screwed a plug 16. There is an opening in one side of the sleeve and the opposing ends of the radius arm and plug are provided with substantially semi-spherical recesses which form the socket for the reception of a ball 17 which is on the outer link of a chain 18 so that the said outer link of the chain is connected to the radius arm by a ball and socket joint. The chain 18 is a block chain. Each alternate link is a single, straight, flat bar 19 of iron or steel, each intermediate link being formed by a pair of similar bars 20 which are arranged on opposite sides of and partially overlap the link bars 19 and are pivotally connected thereto as at 21. Hence, while the chain is free to flex in one direction it is prevented from flexing in another direction. In other words, the chain may flex vertically but not horizontally. The rear link 22 of the chain has its members 20ª provided in their rear ends, which are somewhat diverged, with substantially V-shaped serrated notches 22ª to engage the front side of the tie rod or drag link bar $a$ of the automobile, that being the rod which is parallel with the front axle and which connects the arms that extend rearwardly from the pivot spindles of the front axle and enable the front wheels to be turned in the required direction to guide the machine. In connection with the rear link of the chain, we employ a U-shaped clamp 23 which passes around and engages the rear side of the said tie rod or drag link and the arms of which are provided with slots 24 which receive a notched key 25, the said key passing between the members of the rear link and engaging a spacer 26 between the said members. In the bight or bend of the clamp 23 is a block 26' and the bend or bight of the clamp and the said block are provided with alining threaded openings through which extends a clamping screw 27 which engages the rear side of the drag link or tie rod. This clamp may be adjusted on the tie rod as required and the radius arm must also be adjusted in the base of the spindle according to the required sweep of the lamp or headlight carried on the attachment. The chain by reason of its ability to flex vertically provides necessary flexibility to compensate for the vertical movements of the chassis and tie rod, but permits very little or practically no lateral motion. When the automobile is steered in either direction, the movement of the tie rod or drag link, which is actuated by the steering wheel, causes the chains, and the radius arms to turn the spindles 6 in the standards 1 and, hence, cause the yokes to also turn to move the headlights or lamps so that the headlights instead of taking the curves with the chassis automatically follow the direction of the front wheels and the driver can always see around the curves he is taking.

While we have herein shown and described one embodiment of our invention, we would have it understood that changes may be made in the form, proportion and construction of the several parts without departing from the spirit of our invention and within the scope of the appended claim.

We claim—

An automobile attachment of the class described comprising a standard, means to secure the same in place on one side of the chassis of an automobile, a spindle having its bearings in the standard and provided at its upper end with a headlight supporting means and provided at its lower end with a transverse opening, a radius arm adjustable in the said transverse opening, means to secure said radius arm at any required adjustment, a chain comprising flexible links pivotally connected together for flexing in a vertical direction and against flexing in a horizontal direction, a flexible connection between the front end of the chain and the radius arm, and means to detachably and adjustably secure the rear end of the chain to the tie rod or drag link of the automobile.

In testimony whereof we affix our signatures in presence of two witnesses.

WILLIAM J. MITCHELL.
MILTON W. ATKINS.

Witnesses:
O. C. PERKINS,
OBIE T. McCRAY.

Copies of this patent may be obtained for five cents each, by addressing the "Commissioner of Patents, Washington, D. C."